US008954967B2

(12) United States Patent
Balmin et al.

(10) Patent No.: US 8,954,967 B2
(45) Date of Patent: Feb. 10, 2015

(54) ADAPTIVE PARALLEL DATA PROCESSING

(75) Inventors: Andrey Balmin, San Jose, CA (US);
Kevin Scott Beyer, San Francisco, CA (US); Vuk Ercegovac, Campbell, CA (US); Rares Vernica, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 13/149,312

(22) Filed: May 31, 2011

(65) Prior Publication Data

US 2012/0311581 A1    Dec. 6, 2012

(51) Int. Cl.
*G06F 9/46*    (2006.01)
*G06F 9/50*    (2006.01)

(52) U.S. Cl.
CPC .................... *G06F 9/5066* (2013.01)
USPC .......................................................... 718/100

(58) Field of Classification Search
CPC ........ G06F 9/4843; G06F 9/52; G06F 9/4881
USPC .......................................................... 718/100
See application file for complete search history.

(56) References Cited

U.S. PATENT DOCUMENTS

| | | | |
|---|---|---|---|
| 2005/0131995 A1* | 6/2005 | Chase et al. | 709/203 |
| 2006/0117061 A1* | 6/2006 | Weiss | 707/104.1 |
| 2007/0038659 A1* | 2/2007 | Datar et al. | 707/101 |
| 2008/0086442 A1* | 4/2008 | Dasdan et al. | 707/1 |
| 2008/0120314 A1* | 5/2008 | Yang et al. | 707/101 |
| 2009/0164416 A1 | 6/2009 | Guha | |
| 2010/0156888 A1 | 6/2010 | Luk et al. | |
| 2010/0174754 A1* | 7/2010 | B'Far et al. | 707/794 |
| 2010/0228951 A1 | 9/2010 | Liu | |
| 2010/0241828 A1 | 9/2010 | Yu et al. | |
| 2010/0257198 A1 | 10/2010 | Cohen et al. | |
| 2011/0072206 A1* | 3/2011 | Ross et al. | 711/108 |
| 2011/0276962 A1* | 11/2011 | Chambers et al. | 718/1 |
| 2011/0313973 A1* | 12/2011 | Srivas et al. | 707/634 |

OTHER PUBLICATIONS

Dessloch, S.., et al., "Orchid: Integrating Schema Mapping and ETL", Proceedings of the 24th International Conference on Data Engineering, ICDE 2008, Apr. 7-12, 2008, pp. 1307-1316, Cancún, México. IEEE 2008.

Fagin, R., et al., "Composing Schema Mappings: Second-Order Dependencies to the Rescue", ACM Transactions on Database Systems, Dec. 2005, pp. 994-1055, vol. 30, No. 4, ACM, New York, NY, USA.

(Continued)

*Primary Examiner* — Emerson Puente
*Assistant Examiner* — Steven Do
(74) *Attorney, Agent, or Firm* — Ference & Associates LLC

(57) ABSTRACT

Described herein are methods, systems, apparatuses and products for adaptive parallel data processing. An aspect provides providing a map phase in which at least one map function is applied in parallel on different partitions of input data at different mappers in a parallel data processing system; providing a communication channel between mappers using a distributed meta-data store, wherein said map phase comprises mapper data processing adapted responsive to communication with said distributed meta-data store; and providing data accessible by at least one reduce phase node in which at least one reduce function is applied. Other embodiments are disclosed.

21 Claims, 6 Drawing Sheets

(56) References Cited

OTHER PUBLICATIONS

Fagin, R., et al., "Clio: Schema Mapping Creation and Data Exchange", in Conceptual Modeling: Foundations and Applications—Essays in Honor of John Mylopoulos, LNCS 5600, 2009, pp. 198-230, Springer-Verlag Berlin Heidelberg.

Fuxman, A., et al., "Nested Mappings: Schema Mapping Reloaded", Proceedings of the 32nd International Conference on Very Large Data Bases, Sep. 12-15, 2006, pp. 67-78, Seoul, Korea, ACM, New York, NY.

Kolaitis, P. G., "Schema Mappings, Data Exchange, and Metadata Management", ACM SIGMOD/PODS 2005 Conference, Jun. 13-16, 2005, pp. 61-75, Copyright 2005 ACM, New York, NY, USA.

Simitsis, A., et al., "Optimizing ETL Processes in Data Warehouses", Proceedings of the 21st International Conference on Data Engineering, ICDE 2005, Apr. 5-8, 2005, pp. 564-575, Tokyo, Japan. IEEE Computer Society 2005.

Velegrakis, Y., et al., "Mapping Adaptation under Evolving Schemes", Proceedings of 29th International Conference on Very Large Data Bases, Sep. 9-12, 2003, pp. 584-595, Berlin, Germany.

Yu, C., et al., "Semantic Adaptation of Schema Mappings when Schemes Evolve", Proceedings of the 31st International Conference on Very Large Data Bases, Aug. 30-Sep. 2, 2005, pp. 1006-1017, Trondheim, Norway, ACM, New York, NY.

Nykiel, Tomasz, et al., "MRShare: Sharing Across Multiple Queries in MapReduce", Proceedings of the VLDB Endowment, 36th International Conference on Very Large Data Bases, Sep. 13-17, 2010, 12 pages, vol. 3, No. 1, VLBD Endowment, Singapore.

Schneider, Donovan A., "A Performance Evaluation of Four Parallel Join Algorithms in a Shared-Nothing Multiprocessor Environment", Computer Science Department, University of Wisconsin, 1989, pp. 110-121, ACM, USA.

Shatdal, Ambuj, et al., "Adaptive Parallel Aggregation Algorithms", Proceedings of the 1995 ACM SIGMOD International Conference on Management of Data, May 22-25, 1995, pp. 104-114, ACM Press 1995, San Jose, California, USA.

Vernica, Rares, et al., "Efficient Parallel Set-Similarity Joins Using MapReduce", 2010 ACM SIGMOD, Jun. 6-11, 2010, 16 pages, ACM, Indianapolis, Indiana, USA.

Wolf, Joel L., et al., "New Algorithms for Parallelizing Relational Database Joins in the Presence of Data Skew", IEEE Transactions on Knowledge and Data Engineering, Dec. 1994, pp. 990-997, vol. 6, No. 6, IEEE, New York, New York, USA.

\* cited by examiner

ADAPTIVE PARALLEL DATA PROCESSING

FIELD OF THE INVENTION

The subject matter presented herein generally relates to parallel data processing techniques.

BACKGROUND

The MapReduce parallel data processing framework, pioneered by Google, Inc., has gained popularity in industry as well as in academia. Hadoop is the dominant open-source MapReduce implementation backed by Yahoo! Inc., Facebook Inc., and others.

In order to provide a simple programming environment for the users, MapReduce offers a limited choice of execution strategies. To gain more flexibility, MapReduce inspired massive data processing platforms have emerged, all including elements of MapReduce, but having more choices in runtime query execution.

BRIEF SUMMARY

One aspect provides a computer program product comprising: a computer readable storage medium having computer readable program code embodied therewith, the computer readable program code comprising: computer readable program code configured to provide a map phase in which at least one map function is applied in parallel on different partitions of input data at different mappers in a parallel data processing system; computer readable program code configured to provide a communication channel between mappers using a distributed meta-data store, wherein said map phase comprises mapper data processing adapted responsive to communication with said distributed meta-data store; and computer readable program code configured to provide data accessible by at least one reduce phase node in which at least one reduce function is applied.

Another aspect provides a method comprising: providing a map phase in which at least one map function is applied in parallel on different partitions of input data at different mappers in a parallel data processing system; providing a communication channel between mappers using a distributed meta-data store, wherein said map phase comprises mapper data processing adapted responsive to communication with said distributed meta-data store; and providing data accessible by at least one reduce phase node in which at least one reduce function is applied.

A further aspect provides a system comprising: at least one processor; and a memory device operatively connected to the at least one processor; wherein, responsive to execution of program instructions accessible to the at least one processor, the at least one processor is configured to: provide a map phase in which at least one map function is applied in parallel on different partitions of input data at different mappers in a parallel data processing system; provide a communication channel between mappers using a distributed meta-data store, wherein said map phase comprises mapper data processing adapted responsive to communication with said distributed meta-data store; and provide data accessible by at least one reduce phase node in which at least one reduce function is applied.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
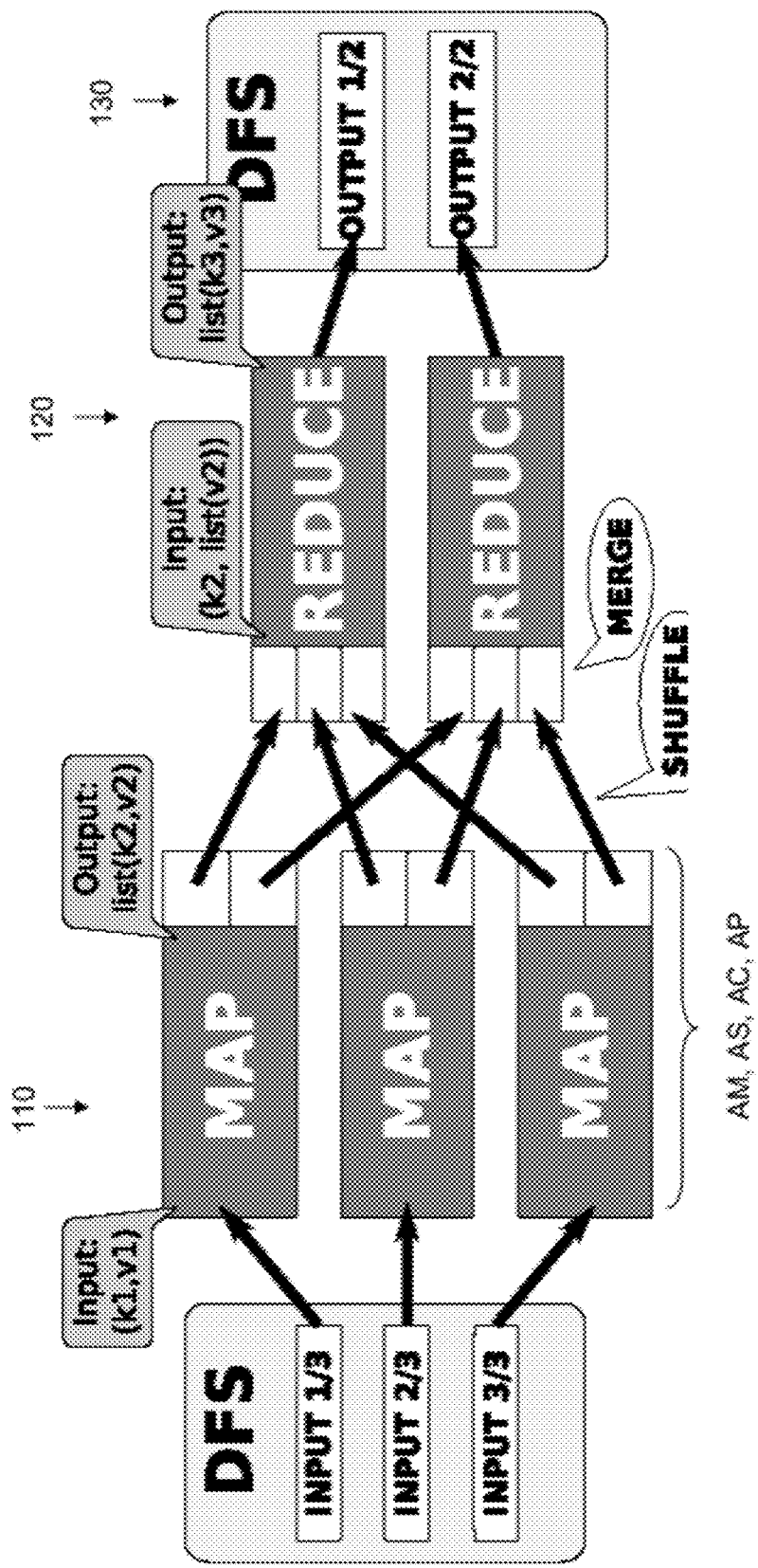
FIG. 1 illustrates an example data flow in MapReduce.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

In this regard, the adaptive techniques are described herein as implemented in the context of Hadoop and Jaql as non-limiting examples. However, the aspects and example embodiments described herein are applicable more broadly. One having ordinary skill in the art should thus understand that these might be easily applied to other contexts and to other systems that include elements of MapReduce or like systems. Similarly, example embodiments are described in connection with APACHE ZOOKEEPER. However, those having ordinary skill in the art will readily understand that implementations may utilize a distributed meta-data store (DMDS) generally, or for example instead use a modified jobtracker, and are within the scope of this disclosure. APACHE ZOOKEEPER is a trademark of The Apache Software Foundation in the United States and other countries.

In contrast to MapReduce inspired massive data processing platforms that have emerged, an embodiment leverages the existing investment in the framework and in the query processing systems built on top of it, such as Jaql, Pig, and Hive.

An embodiment provides situation-aware mappers (SAMs, also referred to herein as adaptive mappers (AMs)) that use a transactional meta-data store to exchange information about their state and collaboratively make optimization decisions. An embodiment employs SAMs to build a number of adaptive optimization techniques that preserve fault tolerance, scalability, and programmability of MapReduce. Embodiments provide significant performance improvements over the existing state-of-the-art techniques, as well as superior performance stability.

An embodiment provides new runtime options to MapReduce that are adaptive to the runtime environment and which avoid making performance tuning difficult. Adaptive techniques demonstrate superior performance stability, as they are robust to tuning errors and changing runtime conditions, such as other jobs running on the same cluster. Furthermore, adaptive techniques do not rely on cardinality and cost estimation, which in turn require accurate analytical modeling of job execution. Such modeling is quite difficult for large scale MapReduce environments because of the scale and interference from other software running in the same cluster. Parallel databases rarely scale to thousands of nodes and always assume full control of the cluster. Moreover, cost modeling is very difficult in a programming environment where much of processing is done by black-box user code. Even in MapReduce based query-processing systems like Jaql, Pig, or Hive, complex queries typically rely on user-defined functions written in Java. That is why such systems offer various query hint mechanisms instead of traditional cost-based optimizers. Thus, in such environments the use of adaptive run-time techniques may be advantageous.

An embodiment makes MapReduce more flexible and adaptive by breaking a key assumption of the programming model: that mappers are completely independent. An embodiment introduces an asynchronous communication channel between mappers by using a distributed meta-data store (DMDS) an example of which may be APACHE ZOOKEEPER. This enables the mappers to post some metadata about their state and see states of all other mappers. Such SAMs get an aggregate view of the job state and can make globally coordinated optimization decisions.

Embodiments utilize SAMs in a number of adaptive techniques. Adaptive mappers (AM) dynamically control the checkpoint interval, adaptive combiners (AC) use best-effort hash-based aggregation of map outputs, adaptive samplers (AS) use some early map outputs to produce a global sample of their keys, and adaptive partitioners (AP) dynamically partition map outputs based on the sample.

The description now turns to the figures. The illustrated example embodiments will be best understood by reference to the figures. The following description is intended only by way of example and simply illustrates certain example embodiments representative of the invention, as claimed MapReduce is a popular paradigm for data-intensive parallel computation in shared-nothing clusters. Example applications for the MapReduce paradigm include processing crawled documents, Web request logs, et cetera. In the open source community, Hadoop is a poplar implementation of this paradigm. In MapReduce, data is initially partitioned across the nodes of a cluster and stored in a distributed file system (DFS). Data is represented as (key, value) pairs. The computation is expressed using two functions:

map(k1,v1)→list(k2,v2);
reduce(k2,list(v2))→list(k3,v3).

FIG. 1 shows the data flow in an example MapReduce computation. The computation starts with a map phase 110, in which the map functions are applied in parallel on different partitions of the input data, called splits. A map task, or mapper, is started for every split, and it iterates over all the input (key, value) pairs applying the map function. The (key, value) pairs output by each mapper are hash-partitioned on the key. The pairs are sorted in a fixed-size memory buffer. Once the buffer is filled up, the sorted run, called a spill, is written to the local disk. At the end of the mapper execution all the spills are merged into a single sorted stream. At each receiving node, a reduce task, or reducer, fetches all of its sorted partitions during the shuffle phase, and merges them into a single sorted stream. All the pair values that share a certain key are passed to a single reduce call. The output of each reduce function 120 is written to a distributed file in the DFS 130. An embodiment adds AM, AS, AC, and AP to this typical data flow, as further described herein.

Figure 2:
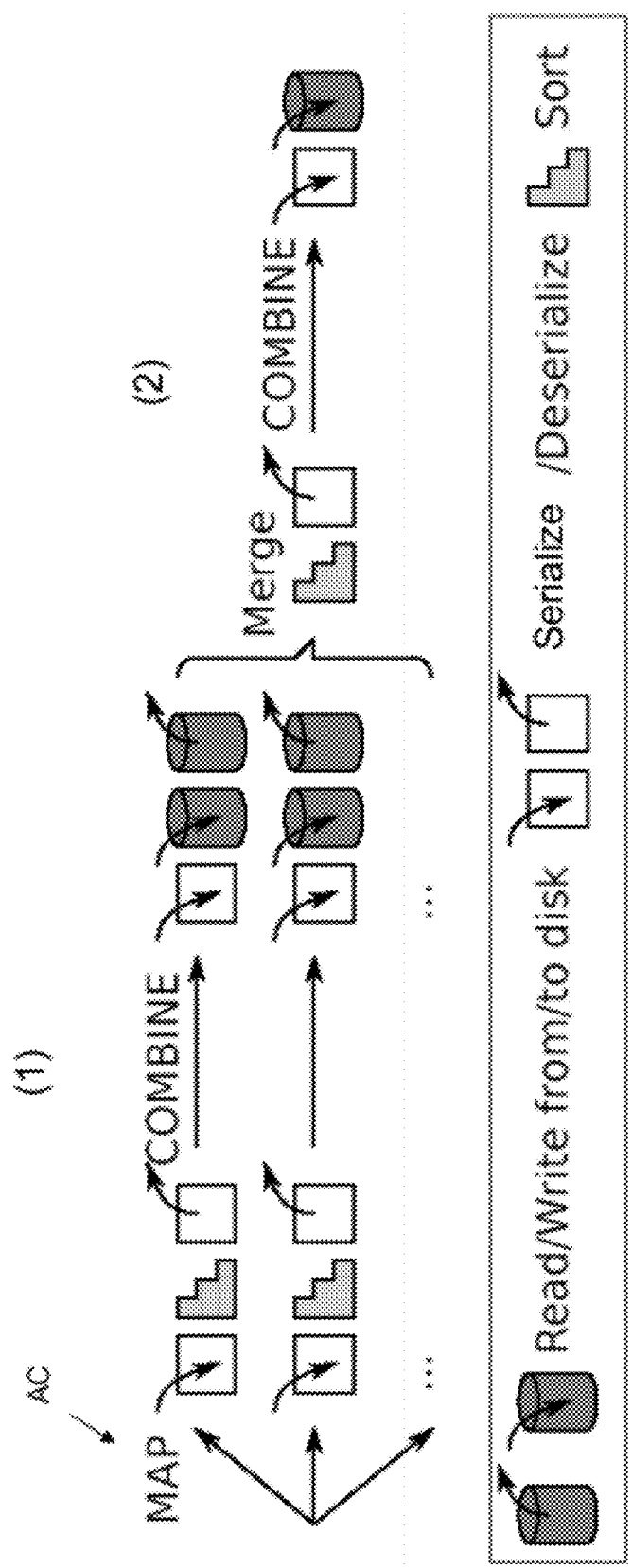
FIG. 2 illustrates example combining processes in MapReduce.

Referring to FIG. 2, a sequence of operations for applying combiners is illustrated. The framework also allows a combine function that is executed on the same nodes as mappers, right after the map functions have finished. This function acts as a local reducer, operating on the local (key, value) pairs. This function allows the user to decrease the amount of data sent through the network. The signature of the combine function is:

combine(k2,list(v2))→list(k2,v2).

In Hadoop, the combine function is applied at (1) once the outputs have been sorted in the memory, just before they are spilled to disk. At the end of the map execution, when all the spills are merged into a single output file, the combiner function is applied again at (2) on the merged results. An embodiment may utilize ACs to provide a mechanism to perform a combine function to the data before it is serialized. In other words, an AC may provide a pre-combiner function that reduces the data size before the traditional combiner is run.

Each node in the cluster has a fixed number of slots for executing map and reduce tasks. A node will not have more map or reduce tasks running concurrently than the corresponding number of slots. If the number of mappers of a job exceeds the number of available map slots, the job runs with multiple waves of mappers. Similarly, the reducers could also run in multiple waves.

Figure 3:
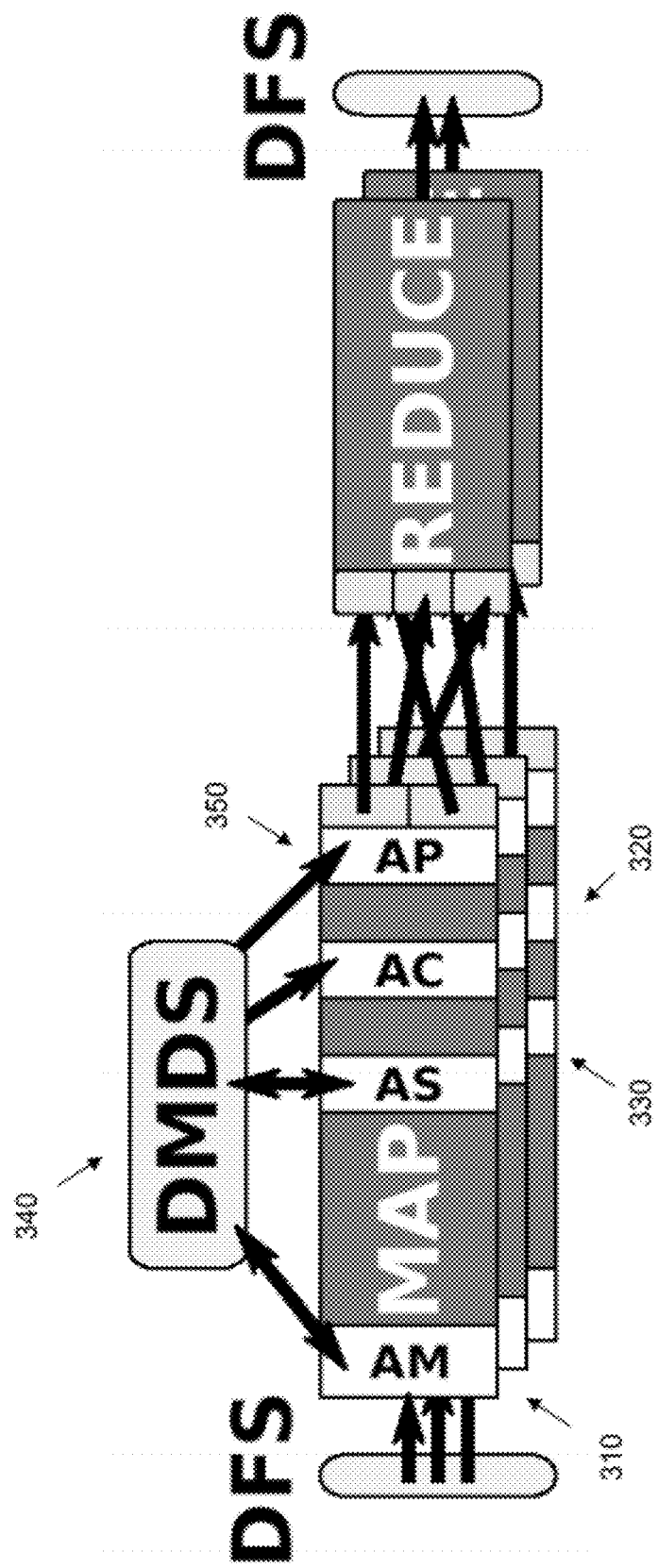
FIG. 3 illustrates an example situation-aware mapping phase.

FIG. 3 illustrates adaptive techniques in the SAMs and their communication with the DMDS. AMs 310 dynamically change the granularity of checkpoints to trade off system performance, load balancing, and fault tolerance. MapReduce (and its Hadoop implementation) support intra job fault tolerance by running a separate map task and checkpointing the output, for every input data partition (split). This makes split size an important tuning parameter because having too few splits results in poor load balancing and decreased performance under faults, while with too many splits the overhead of starting and checkpointing the tasks may dominate the job's running time. In contrast, AMs may make a decision after every split to either checkpoint or take another split and stitch it to already processed one(s). The result is minimum task startup overhead and dynamic load balancing.

ACs 320 perform local aggregation in a fixed-size hash table kept in a mapper, as does Hive. However, unlike other systems, once the hash table is filled up, it is not shed. An AC 320 keeps the hash table and starts using it as a cache. Before outputting a result, the mapper probes the table and calls the local aggregation function (combiner) in case of a cache hit. The behavior in case of a cache miss is determined by a plugable replacement policy. Two example replacement policies, no replacement (NR) and least recently used (LRU), are discussed herein. NR is very efficient, as its performance overhead is barely noticeable even when map outputs are nearly unique. LRU overhead is substantially higher, however it can outperform NR due to a better cache hit ratio. LRU performs better if map output keys are very skewed or clustered.

While ACs 320 use an adaptive technique, their decisions are local and thus do not utilize AMs 310. However, an embodiment employs AM-based adaptive sampling techniques using ASs 330 to predict if ACs 320 will benefit query execution, and decide which replacement policy and cache size to use. Also, AMs further improve the performance benefit of ACs as they increase the amount of data that gets combined in the same hash table.

Adaptive sampling collects a sample of map output keys and aggregates them into a global histogram. During its initial sampling phase, every AM 310 may write a subset of the output keys to a separate sample file, and continuously updates the DMDS 340 with whatever information is needed to determine if a sufficient sample has been accumulated.

For example, if the adaptive sampling stopping condition is to generate k samples, every mapper will increment a sample size counter in the DMDS 340 every time it appends its sample file with k=100 output keys. The first mapper that detects that the stopping condition has been satisfied becomes the leader, collects all the sample files, and aggregates them into one histogram. An AS 330 utilizes AMs 310 to take the input splits in random order, thus the histogram is equivalent to what a coarse block-level sampling would produce.

Adaptive sampling has distinguishing features from static, pre-determined, sampling runs that have been proposed in the parallel database literature. For example, adaptive sampling is more efficient since the map outputs used in the sample do not need to be produced again by the main query run. Moreover, adaptive sampling is able to determine when to stop sampling at runtime, based on a global condition, for example the total number of keys output by all mappers. For complex queries, for example with black-box predicates, this avoids sample runs that are either too big or too small, often by a very large margin.

The histogram produced by adaptive sampling has many uses. One is for tuning parameters of adaptive combining Another is for adaptive partitioning by adaptive partitioners (APs) 350, which allows changing the partitioning of map outputs among the reducers based on the histogram produced by adaptive sampling. In particular, active partitioning can produce equal-sized range partitions to support parallel sorting of map outputs, or reduce skew in joins. Adaptive sampling outputs may be utilized in other adaptive optimization decisions, such as within a MapReduce job (for example, join methods) and between the jobs (for example, join order).

Thus, an embodiment utilizes MapReduce's flexible programming environment to implement situation-aware mappers (AMs) and use them in the adaptive techniques described herein, for example without needing to change Hadoop itself. For example, the adaptive techniques may be packaged as a library that can be used by Hadoop programmers through a simple API. Notice that the original programming API of MapReduce may remain completely unchanged. In order to make the adaptive techniques completely transparent to the user, an embodiment may be implemented inside the Jaql query processor. Again, as an example, the DMDS 340 may utilize APACHE ZOOKEEPER, a transactional, distributed coordination service.

A component of SAM-based techniques described herein is a DMDS 340. The DMDS 340 performs efficient distributed read and writes of small amounts of data in a transactional manner. The example implementation uses a distributed coordination service. The service is highly available, if configured with three or more servers, and fault tolerant. Data is organized in a hierarchical structure similar to a file system, except that each node can contain both data and sub-nodes. A node's content is a sequence of bytes and has a version number attached to it. A server keeps the entire structure and the associated data cached in memory. Reads are extremely fast, but writes are slightly slower because the data needs to be serialized to disk and agreed upon by the majority of the servers. Transactions are supported by versioning the data. The service provides a basic set of primitives, like create, delete, exists, get and set, which can be easily used to build more complex services such as synchronization and leader election. Clients can connect to any of the servers and, in case the server fails, they can reconnect to any other server while sequential consistency is preserved. Moreover, clients can set watches on certain distributed meta-data store nodes and they get a notification if there are any changes to those nodes.

Adaptive MapReduce Example

An example set of techniques is now described for making the MapReduce framework more adaptive to the input data and runtime conditions. These techniques affect different parts of a MapReduce job, yet all of them may be implemented inside the map tasks and they all may rely on a DMDS for global communication. That is, they utilize SAMs. SAM-based techniques dynamically alter job execution based on the map input, output, and the environment. This allows relieving the user, or the high-level-language compiler, from making the right choices before each job starts. SAM-based techniques decentralize the decision making for such changes. Note that SAMs may make all the decisions, and the DMDS may provide only an API for data access and does not need to execute any user code. This reduces the load on the coordinator, and prevents it from becoming a bottleneck. It also makes the decision process more flexible, as decisions that affect only the local scope are made individually by each SAM.

Adaptive Mappers

In a MapReduce job, there is a one-to-one correspondence of map tasks and partitions of input data (splits) that they process. To balance the workload across the cluster, a job can have many waves of mappers, that is, more map tasks than map slots available to execute them. However, having more mappers increases task scheduling and starting overhead. Also, more mappers implies having smaller splits, which tends to reduce the benefit from applying a combiner.

AMs 310 decouple the number of splits from the number of mappers, obtaining the best of both worlds. That is, load balancing, reduced scheduling and starting overhead, and combiner benefit are realized. This decoupling may be achieved as follows. The split location information is stored in a DMDS 340. A fixed number of mappers are started and they compete for splits. The split assignment conflicts are resolved using the transaction capabilities of the DMDS 340.

Figure 4:
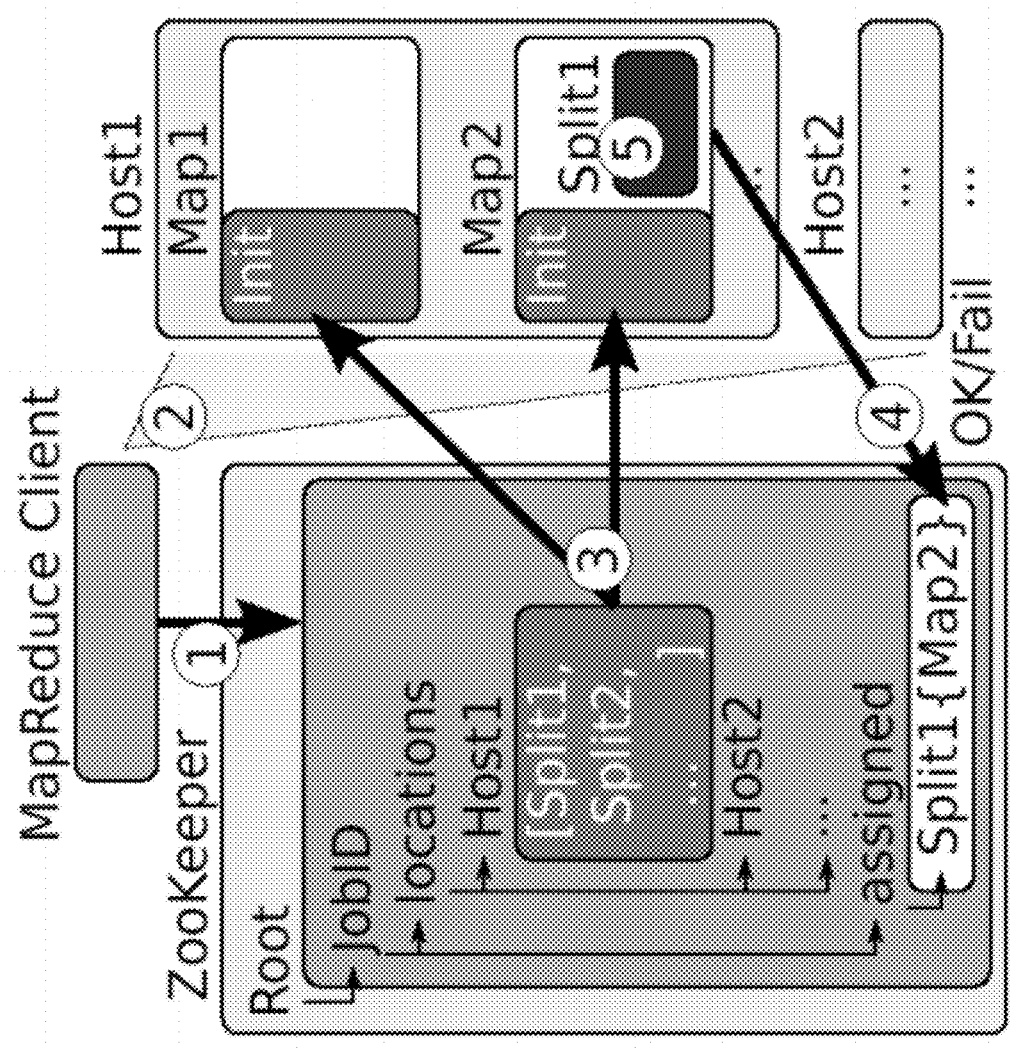
FIG. 4 illustrates an example flow of execution and the data structures of an example adaptive mapping process.

FIG. 4 illustrates an example flow of execution and the data structures of an example adaptive mapping implementation. In (1), a MapReduce client creates an adaptive mapping data structure (for example, in a DMDS). For each job, an embodiment creates locations and an assigned node. The location node contains metadata for all input splits, organized by hosts where these splits are available. On multi-rack clusters, hosts are further organized by rack and data-center. The assigned node will contain information about which split got processed by which map.

In (2), the MapReduce client uses virtual splits to start mappers. When the virtual splits are initialized, they connect to DMDS and retrieve a list of the real splits, which are local to the current host (3). In (4), an AM picks a random split from the list and tries to lock it. The randomness helps minimize the number of locking collisions between AMs working on the same host. For example, Map2 tries to lock Split1 for processing by creating a node for Split1 under the assigned node. The created node contains the ID of the map. If the node creation succeeded, the AM has locked the split and can process it in (5). After all the data from the chosen split is processed, the AM tries to pick a new split. If it succeeds, mapper processing continues unaffected. The split switch is transparent to the map function unless it explicitly asks for the location of the split.

When AMs finish processing local splits, they start processing any unprocessed remote splits. If no more splits are available in DMDS, mappers end their execution. As mappers process splits and accumulate output data, the output data is sorted and shuffled, and in case of AM failure, the data has to be reprocessed. After each split they process, AMs decide if they should pick another split or stop execution, based on how long they've been running, how many splits they processed, and/or how much output they produced. For instance, an AM stops execution if the size of its output exceeds a pre-determined threshold. The intuition is that if map output size is significant, it may be advantageous to start the shuffle early and overlap it with the mappers.

Once an AM stops, the reducers can start copying its output. Additionally, a user may chose to specify a time limit t to mitigate performance impact of failures. An AM will not take any more splits if it had been running longer than t. Given a mean time between failures (MTBF), it is possible to automatically optimize t by doing a simple cost-benefit analysis. The cost of taking an additional split is paid for during failures when more work must be redone, but the benefit eliminates per-split start-up time during normal processing. Every AM may observe how long it's been running and remember how long the map start-up took. If AMs in the earlier waves decide to stop, AMs in the later stages get to process the rest of the data. The AMs of the last wave do not stop until all splits are processed.

An important aspect of the MapReduce framework is its fault-tolerance. Because AMs manage the splits themselves, special care may need to be taken to handle task failures. Essentially, as an AM gets splits, those splits are not processed by other AMs. If an AM fails, the splits that it tried to process need to be eventually processed (possibly by other AMs).

AM failure detection and resolution relies on the fact that MapReduce automatically restarts failed mappers and increases a predefined field of the task ID to mark the restart. When started, AMs inspect their task ID to identify if they are a restarted mapper. In this case, AMs scan the assigned node and remove all the entries assigned to the previous run of the same task. In this way, the splits assigned to the previous run become available for reassignment. In order for the other AMs to learn about the newly available splits, they read the assigned node when they run out of splits. In this way other AMs can help balance the workload which needs to be redone.

To implement adaptive mappers in Hadoop, a new input format may be created as well as a new record reader. The new input format and record reader wrap the job's original input format and record reader. When Hadoop asks the input format for the splits, the real splits are stored in a DMDS and a number of virtual splits are created and returned. When Hadoop asks the record reader to read a record from a virtual split, a real split is fetched and the record is read from it instead.

To facilitate multiple waves of mappers, an embodiment may start, by default, for example four times more AMs than slots in the cluster. Four waves of mappers may provide a benefit from overlapping the map and shuffle phases, without introducing much overhead. If advanced users specify an AM time limit, they might also manually adjust the number of waves based on their expectation of the map running time. An alternative to starting a fixed number of waves would be to modify the MapReduce framework to allow new virtual splits to be created during job execution, as needed.

To ensure good balance between the AMs, by default, an embodiment asks MapReduce to generate for example 32*N real splits, where N is the number of slots in the cluster. The number of virtual splits may be set to for example 4*N. This way the job gets processed by four waves of AMs, unless the map outputs are small, and each mapper, on average, takes 8 splits.

AMs take special care not to interfere with the MapReduce scheduling algorithms that assume relatively small and approximately equal-sized tasks. The default Hadoop FIFO scheduler is based on a FIFO queue, and it always assigns all the map tasks of a job to the available slots before taking any map tasks of the next job in the queue. Thus, the FIFO scheduler operates the same way with regular mappers and with AMs.

In contrast, the FAIR scheduler, that has gained popularity in large shared clusters, divides slots between multiple jobs and schedules tasks of all the jobs at the same time. FAIR avoids starvation of a smaller job that arrives in the system after a large job by reducing the number of slots allocated to the large job. As some map task of a large job finishes, its slot can be used to run the tasks of a smaller job. Thus, the large job gets throttled down to let the small job finish first. FAIR policy typically results in much better average response time for batches of jobs than FIFO. Notice that FAIR relies on large jobs having many waves of mappers to throttle them down. This is usually the case for normal mappers. However, AMs may finish the entire job in one wave, in which case FAIR performance regresses to that of FIFO.

To support FAIR, AMs may include a mechanism to respect slot allocations and shut down some AMs if the allocation shrinks To achieve this, an embodiment may store the number of slots allocated to every job in a DMDS. A small modification may be introduced to FAIR scheduler code so that every time this number gets changed by the scheduler, it is also updated in the DMDS. The DMDS may also maintain a number of currently running AM tasks for each job. Every time a non-last-wave AM tries to take a new split, it reads these two counters for its job, and if the number of running AMs exceeds the current allocation, the AM terminates. Last wave AMs do not do this check to guarantee job completion. Note that if FAIR increases slot allocation for an adaptive job, Hadoop will start new AMs. For more advanced schedulers that need to understand performance characteristics of a job, other changes may be needed to support AMs. For example the FLEX scheduler would be updated to read from the DMDS in order to understand how much progress a job has made (as measured by real splits).

Adaptive Combiners

MapReduce supports local aggregation of map outputs using combiner functions to reduce the amount of data that needs to be shuffled and merged in the reducers. The combiners require all map outputs to be serialized and sorted. However, it is know that hash-based aggregation often performs better than sort-based aggregation.

The ACs replace sort with hashing for the frequently occurring map output keys by maintaining a fixed size cache of partial aggregates (implemented as a hash-map). For each map output, R, an embodiment probes the cache with R's key.

On a cache hit, the combine function is applied for the output value and the cached value, and the result is stored back into the cache. On a cache miss, if the cache is not full, an embodiment creates a new entry for the output pair. If the cache reached its size limit, a pair has to be output. Depending on the cache re-placement policy, an embodiment may either directly output the current pair (NR policy), or insert the current pair into the cache and remove and output the least recently used (LRU) pair from the cache (LRU policy). Finally, when there is no more input for the map, an embodiment scans the cache and writes all the pairs to the output.

Regarding replacement policies, in NR an embodiment directly outputs the current pair. This policy assumes that frequent keys will be inserted into the cache before it gets full. If the key distribution is uniform or normal and in no particular order, than, on average, the first set of keys that could fit into the cache are as good as any set of keys. Moreover, this cache policy has very small overhead as no deletions are performed. In LRU, an embodiment inserts the current pair in the cache and removes and outputs the pair with the least recently used key from the cache. The main idea of this policy is to keep in the cache the current popular keys and maximize the aggregation opportunities. For instance, LRU is an optimal policy if data is sorted on the output key, whereas NR may perform very badly in this case, depending on the order. Other policies can also be implemented.

To make use of the multi-core machines available to a MapReduce cluster, usually, multiple mappers are scheduled to run in parallel in different processes, on a single node. Using ACs each mapper will have its own cache. One such cache can only use a fraction of the memory and do a fraction of the possible aggregations. One way to overcome this is to have a single map process with multiple threads and a single shared cache. ACs could be easily adapted to work in a multi-threaded setting, using ideas that have been explored for hardware caching of hash tables on multi-core machines.

Notice that ACs are best effort aggregators. They might not perform all the possible aggregations, but they will never spill to disk. In fact, the regular combiners are still enabled and they will be able to perform the aggregations missed by the cache. Also worth noting is that the ACs operate on de-serialized records, as they reduce the amount of data that regular combiners have to serialize and sort. Moreover, ACs benefit increases when they are used with AMs, since multiple splits can be processed by an AC without draining and rebuilding the cache.

Adaptive Sampling and Partitioning

The partitioning function of a MapReduce job decides which data goes to which reducer. By default the partitioning is done by hashing, though a custom partitioning function may be used (for example, range partitioning for global sorting, or for performance reasons.) Custom or not, the partitioning function is statically decided before the job starts. In cases when good partitioning depends on the input data, a separate sampling job is often used. The sampling could be expensive as it is not clear how much input data the mappers need to process to produce sufficient output between all of them. Also, the sampling effort is wasted when all the data is reprocessed by the main job.

In contrast, an AS technique piggybacks on the main job, and dynamically decides when to stop sampling, to produce a global histogram of map output keys early in the map stage. This histogram has many applications, for example, setting AC parameters. An important one is AP, which dynamically decides the partitioning function while the job is running Adaptive Sampling A goal of adaptive sampling is to obtain a good sample of the mapper output and balance the sampling workload across the cluster. The main idea is to have mappers independently sample their output data while coordinating to meet a global sampling requirement. After the sampling requirements are met, a leader mapper is elected to aggregate the samples. The coordination between mappers may be achieved using the DMDS.

Figure 5:
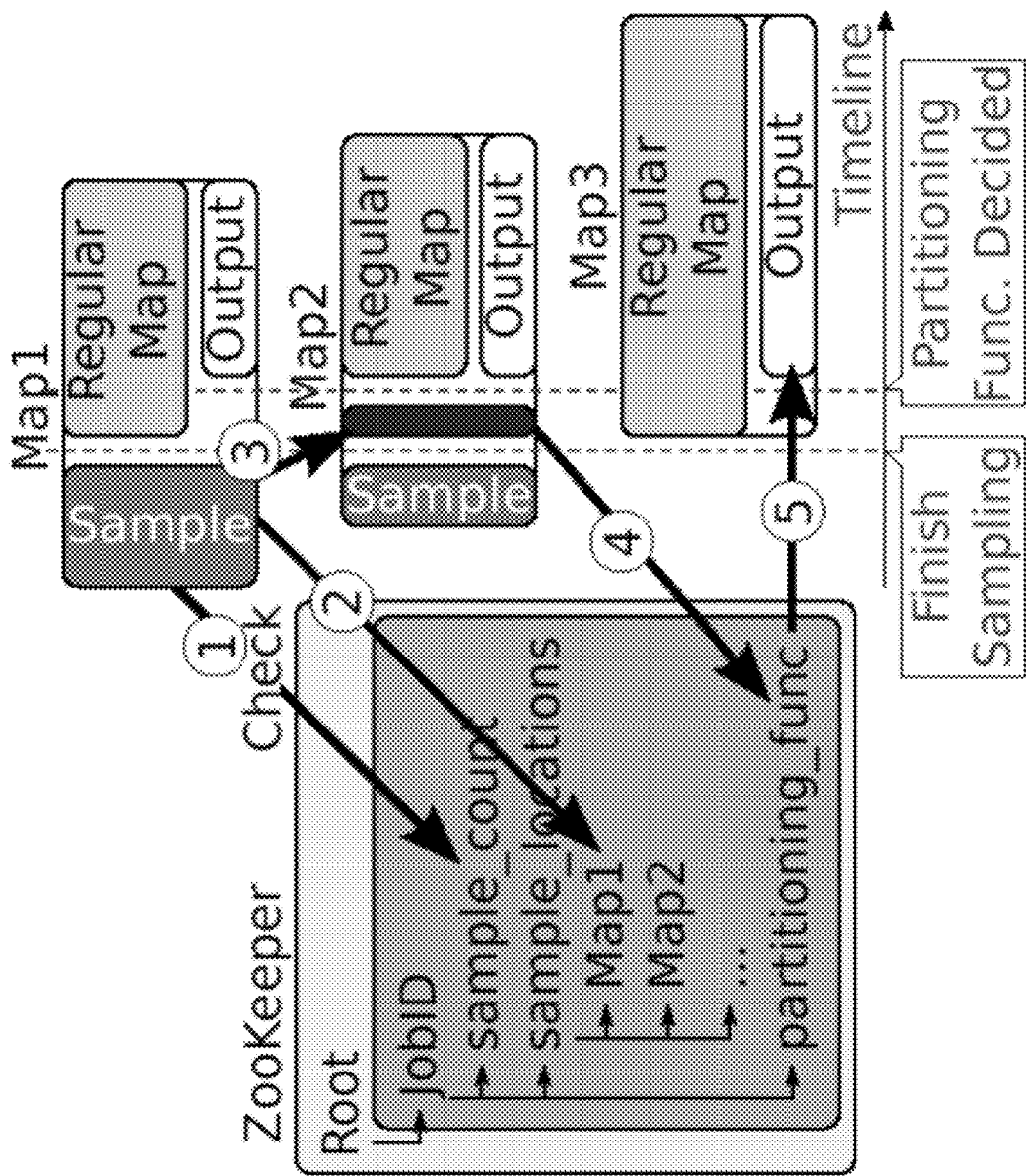
FIG. 5 illustrates an example of communication between adaptive mappers and a distributed meta-data store.

Adaptive sampling depends on AMs for two reasons. First, AMs randomly chose input splits to ensure a random block sampling. Second, AMs guarantee that enough map outputs are generated in the first wave by not stopping execution until the histogram is produced. FIG. 5 illustrates the communication between AMs and a DMDS during adaptive sampling (steps 1-3).

In this example, the global sampling requirement is a fixed number of samples, so the DMDS stores the current sample count. When AMs start, they check the DMDS to see if the global sampling requirement is met (1). If the requirement is not met, the AMs start sampling their outputs. Once an AM accumulates a fraction of the required samples (for example, in the case the fixed number of samples, a good fraction is 1%), it updates the sample count in the DMDS, writes the sample to the local disk and publishes the location in the DMDS (2). Once an AM observes that the global requirement is met, it stops sampling and applies for leader election, using the DMDS. Once a lead AM is elected, the leader queries the DMDS for the sample locations and retrieves and aggregates all the samples (3). The overhead introduced by the leader election and the sample aggregation is negligible in practice (1-2 seconds). The non-leader AMs continue their regular map processing.

Depending on why sampling is necessary, the mappers could directly output the processed data or they might have to buffer it until the sampling process has finished. If the sampled data is necessary for partitioning, the AMs can not output any data until the leader aggregates the samples and the partitioning map is computed (as described in connection with adaptive partitioning herein). In this case, AMs allocate a buffer for storing processed data until it can be output. In case the output buffer becomes full, the AMs have the option of stalling, writing the processed data to disk, or discarding and reprocessing the data after the sampling is completed. The sampling process is balanced across the cluster due to the global coordination between the AMs. AMs might end up sampling different amounts of data depending on when they are scheduled.

Adaptive Partitioning

Adaptive partitioning determines the partitioning function while the job is evaluated. The main idea is for AMs to start processing data, but not produce any output. In parallel, AMs co-ordinate and the partitioning function is decided by one of them based on the data seen so far. As soon as the partitioning function is decided, the AMs can start outputting data. Adaptive partitioning piggybacks on adaptive sampling, which already aggregated seen map outputs into a single histogram at a leader AM.

Based on this histogram, the same AM leader may compute a partitioning function and published it in the DMDS ((4) in FIG. 5). For example, if range partitioning is needed to perform global sort, adaptive partitioning will split the histogram into contiguous key ranges with approximately the same number of total occurrences. As soon as the partitioning function becomes available in the DMDS, the AMs start outputting data, which triggers the start of their partitioners. Each AP, upon start-up, loads the partitioning map from the DMDS (5) and the job continues normally.

Adaptive sampling and adaptive partitioning may be used as primitives to obtain more optimization opportunities for MapReduce jobs. For global sorting, adaptive sampling may be used to sample the data and adaptive partitioning may be used to decide the range partitioning points to balance the data across the cluster.

For joining, adaptive sampling and partitioning may be used to perform the following optimization in the case of a redistribution equi-join. In this join algorithm provenance labels need to be added to the each (key, value) pair, for example "R" for pairs coming from the first dataset and "S" for the pairs coming from the second dataset. In reducers, for each unique key, all pairs labeled with R are buffered in memory while the pairs labeled with S are streamed by. Using adaptive sampling, an embodiment may detect which of the two datasets has a smaller set of values for each unique key and assign the first label, R, to it. In this way, an embodiment may reduce the memory utilization in the reducer. This optimization is especially useful in the case of foreign-key joins. Another possible optimization is to dynamically switch between different join algorithms.

Moreover, similar to the global sorting case, adaptive sampling and partitioning also may be used to better balance the workload among reducers, in case of skewed joins. Besides balancing the data across the cluster, adaptive partitioning could be used to intentionally unbalance the data. One example where this could be useful is when the mappers are very selective and, as a result, the amount of data that needs to be processed by the reducers is very small. In this case, the pre-allocated reducers waste most of the time in startup and shutdown overheads. Instead, an embodiment may detect such situations in an AP and direct all the data to a single reducer. The rest of the pre-allocated reducers will terminate immediately after the AMs end.

Adaptive sampling also may be used for combiner tuning. For example, an embodiment may exploit the global sampling mechanism to choose the right configuration parameter for the AC cache. That is, by looking at the global distribution of the data, an embodiment decides upon the following: (1) whether to use cache or not, and (2) which cache policy to use. This decision may be made based on the following heuristic.

First, if the number of distinct keys in the sample is over 75% of the sample, adaptive combining is disabled. If the frequency of the $10^{th}$ most frequent key is over 0.1% of the sample size, or it is detected that the keys are ordered, adaptive combining is turned on with the LRU replacement policy. Otherwise, adaptive combining with NR policy is used. The cache size may be set based on the average size of the map output record, which may be measured in adaptive sampling. While a job is running, adaptive sampling could be used to monitor or debug the progress of the AMs. As sample locations get published in a DMDS, the UI could periodically fetch the samples and present them to the user for inspection.

It is understood that although this disclosure includes references to cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. Such a cloud model may include at least five characteristics, at least three service models, and at least four deployment models.

Some example characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (for example, mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Some example service models are as follows: Software as a Service (SaaS): the capability provided to the consumer is to use the provider's applications running on a cloud infrastructure. The applications are accessible from various client devices through a thin client interface such as a web browser (for example, web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Some example deployment models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (for example, mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (for example, cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
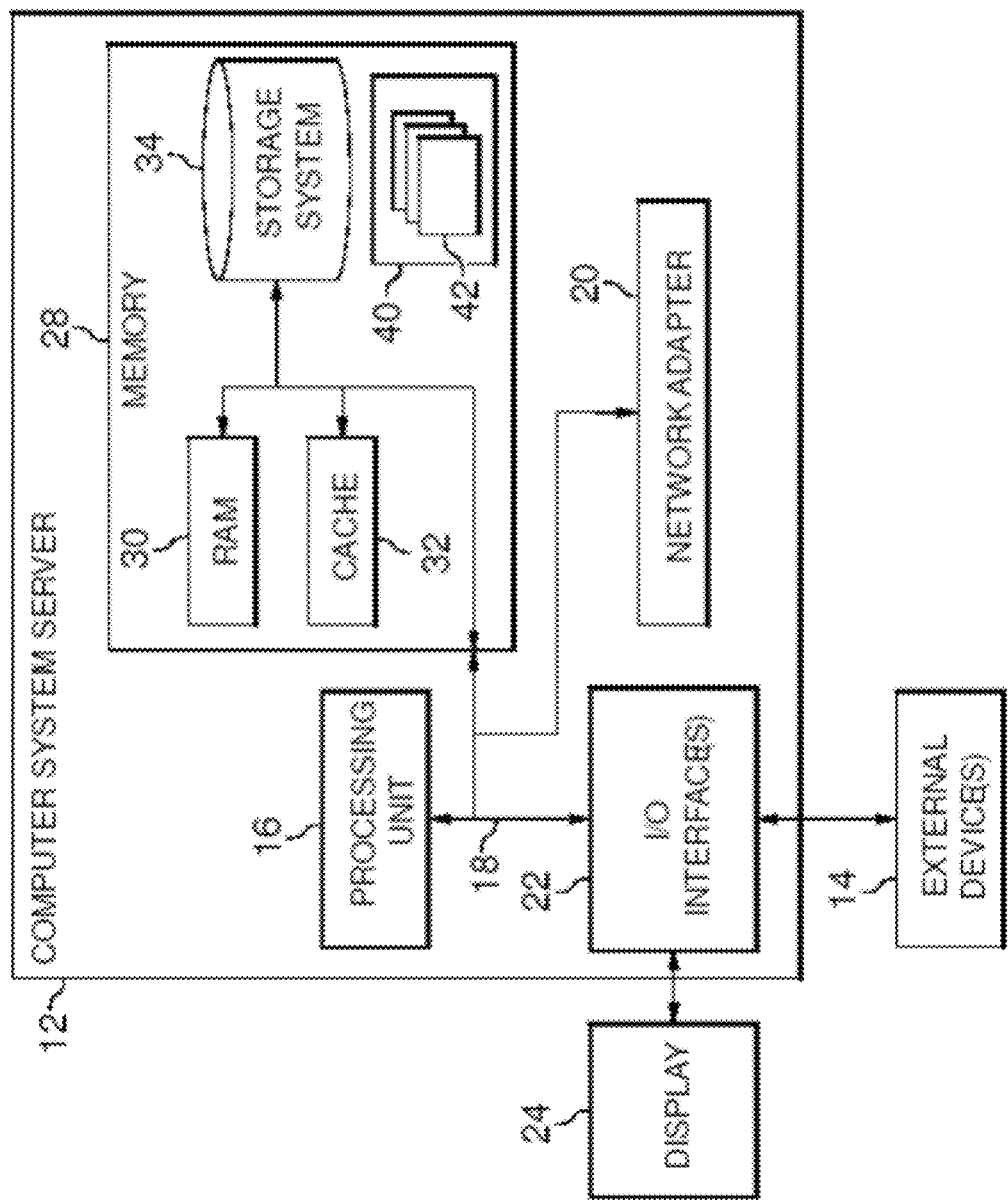
FIG. 6 illustrates an example computing device.

Referring now to FIG. 6, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein, for example that of situation-aware mapping.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, et cetera; one or more devices that enable a user to interact with computer system/server 12; and/or any devices (for example, network card, modem, et cetera) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, et cetera.

A cloud computing environment may comprise one or more cloud computing nodes 10 with which local computing devices used by cloud consumers, such as, for example, personal digital assistant (PDA) or cellular telephone, desktop computer, laptop computer, et cetera may communicate. Nodes 10 may communicate with one another. They may be grouped physically or virtually, in one or more networks, such as Private, Community, Public, or Hybrid clouds as described herein, or a combination thereof. This allows cloud computing environment to offer infrastructure, platforms and/or software as services for which a cloud consumer does not need to maintain resources on a local computing device. It is understood that the types of computing devices mentioned herein are intended to be illustrative only and that computing nodes 10 and cloud computing environment can communicate with any type of computerized device over any type of network and/or network addressable connection (for example, using a web browser).

Generally a set of functional abstraction layers may be provided by a cloud computing environment. It should be understood that the components, layers, and functions of a cloud computing environment referenced herein are intended to be illustrative only and embodiments are not limited thereto. The following layers and corresponding functions may for example be provided.

Hardware and software layer may include hardware and software components. Examples of hardware components include mainframes, in one example IBM ZSERIES systems; RISC (Reduced Instruction Set Computer) architecture based servers, in one example IBM PSERIES systems; IBM XSERIES systems; IBM BLADECENTER systems; storage devices; networks and networking components. Examples of software components include network application server software, in one example IBM WEBSPHERE application server software; and database software, in one example IBM DB2 database software. IBM, ZSERIES, PSERIES, XSERIES, BLADECENTER, WEBSPHERE, and DB2 are trademarks of International Business Machines Corporation registered in many jurisdictions worldwide.

Virtualization layer provides an abstraction layer from which the following examples of virtual entities may be provided: virtual servers; virtual storage; virtual networks, including virtual private networks; virtual applications and operating systems; and virtual clients. In one example, management layer may provide functions such as the following.

Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer may provide the following examples of functionality for which the cloud computing environment may be utilized. Examples of workloads and functions which may be provided from this layer include: mapping and navigation; software development and lifecycle management; virtual classroom education delivery; data analytics processing; transaction processing; and cost-aware replication of intermediate data in dataflows.

As will be appreciated by one skilled in the art, aspects may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to figures of methods, apparatus (systems) and computer program products according to embodiments. It will be understood that portions of the figures can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer program product comprising:
    a non-transitory computer readable storage medium having computer readable program code embodied therewith, the computer readable program code comprising:
    computer readable program code configured to provide a map phase in which at least one map function is applied in parallel on different partitions of input data at different mappers in a parallel data processing system, and to perform the map phase;
    computer readable program code configured to provide a communication channel which enables communication between mappers using a distributed meta-data store;
    wherein to perform the map phase comprises:
        using the communication channel to permit each mapper to:
            post meta-data for use by at least one other mapper about its state; and
            receive information regarding a state of at least one other mapper; and
        performing mapper data processing which is adapted responsive in response to the communication which takes place between mappers via the distributed meta-data store; and
    computer readable program code configured to provide data accessible by at least one reduce phase node in which at least one reduce function is applied.

2. The computer program product according to claim 1, further Comprising:
    computer readable program code configured to provide local combining at a mapper using hashing for frequently occurring mapper output pairs via maintaining a cache of partial aggregates.

3. The computer program product according to claim 2, wherein to provide local combining further comprises:
    for each mapper output pair, probing the cache with a key of the mapper output pair;
    on a cache hit, applying a combine function for the mapper output pair and a cached value, a result being stored back into the cache; and
    on a cache miss, creating a new entry for a mapper output pair in said cache;
    said computer program product further comprising:
    computer readable program code configured to, responsive to determining the cache has reached a size limit, output a mapper output pair based on a cache replacement policy; and
    computer readable program code configured to, responsive to determining that there is no more input for a mapper, scan the cache and write all mapper output pairs for the mapper.

4. The computer program product according to claim 3, wherein the cache replacement policy is selected from: no replacement and least recently used.

5. The computer program product according to claim 1, wherein to provide a map phase further comprises utilizing adaptive mappers, wherein an adaptive mapper takes zero or more splits, adapts to runtime conditions, and decides when to take a given split based on optimization of job performance.

6. The computer program product according to claim 5, wherein meta-data of said splits is stored in said distributed meta-data store, and further wherein adaptive mappers compete to lock said splits.

7. The computer program product according to claim 5, wherein an adaptive mapper is configured to recover from failure; and further wherein an adaptive mapper is configured to reprocess one or more splits claimed by another, failed adaptive mapper.

8. The computer program product according to claim 5, wherein an adaptive mapper is configured to take into consideration potential failure when taking said zero or more splits.

9. The computer program product according to claim 2, wherein to provide local combining further comprises providing local combining on de-serialized data.

10. The computer program product according to claim 1, further comprising computer readable program code configured to sample mapper output independently at a mapper and communicate to said distributed meta-data store to achieve a coordinated global sampling requirement.

11. The computer program product according to claim 10, further comprising computer readable program code configured to, responsive to the global sampling requirement being met, elect a leader mapper to aggregate all samples.

12. The computer program product according to claim 10, further comprising computer readable program code configured to provide adaptive partitioning to determine a partitioning function in parallel with mappers applying mapping;
    wherein mappers co-ordinate to determine the partitioning function based on the sampling via communication with the distributed meta-data store.

13. The computer program product according to claim 9, further comprising computer readable program code configured to utilize sampling of mapper output to determine an optimal cache size and replacement policy for combining.

14. A method comprising:
    providing a map phase in which at least one map function is applied in parallel on different partitions of input data at different mappers in a parallel data processing system, and performing the map phase;
    providing a communication channel which enables communication between mappers using a distributed meta-data store;

wherein performing the map phase comprises:
    using the communication channel to permit each mapper to:
        post meta-data for use by at least one other mapper about its state; and
        receive information regarding a state of at least one other mapper; and
    performing mapper data processing which is adapted in response to the communication which takes place between mappers via the distributed meta-data store; and
    providing data accessible by at least one reduce phase node in which at least one reduce function is applied.

15. The method according to claim 14, further comprising:
    providing local combining at a mapper using hashing for frequently occurring mapper output pairs via maintaining a cache of partial aggregates.

16. The method according to claim 15, wherein providing local combining further comprises:
    for each mapper output pair, probing the cache with a key of the mapper output pair;
    on a cache hit, applying a combine function for the mapper output pair and a cached value, a result being stored back into the cache; and
    on a cache miss, creating a new entry for a mapper output pair in said cache;
    said method further comprising:
        responsive to determining the cache has reached a size limit, outputting a mapper output pair based on a cache replacement policy; and
        responsive to determining that there is no more input for a mapper, scanning the cache and writing all mapper output pairs for the mapper.

17. The method according to claim 16, wherein the cache replacement policy is selected from: no replacement and least recently used.

18. The method according to claim 15, wherein providing local combining further comprises providing local combining on de-serialized data.

19. The method according to claim 14, further comprising sampling mapper output independently at a mapper and communicating to said distributed meta-data store to achieve a coordinated global sampling requirement.

20. The method according to claim 19, further comprising:
    responsive to the global sampling requirement being met, electing a leader mapper to aggregate all samples; and
    providing adaptive partitioning to determine a partitioning function in parallel with mappers applying mapping;
    wherein mappers co-ordinate to determine the partitioning function based on the sampling via communication with the distributed meta-data store.

21. A system comprising:
    at least one processor; and
    a memory device operatively connected to the at least one processor;
    wherein, responsive to execution of program instructions accessible to the at least one processor, the at least one processor is configured to:
    provide a map phase in which at least one map function is applied in parallel on different partitions of input data at different mappers in a parallel data processing system, and to perform the map phase;
    provide a communication channel which enables communication between mappers using a distributed meta-data store;
    wherein to perform the map phase comprises:
        using the communication channel to permit each mapper to:
            post meta-data for use by at least one other mapper about its state; and
            receive information regarding a state of at least one other mapper; and
        performing mapper data processing which is adapted in response to the communication which takes place between mappers via the distributed meta-data store; and
    provide data accessible by at least one reduce phase node in which at least one reduce function is applied.

* * * * *